United States Patent
Park et al.

(10) Patent No.: US 8,661,276 B2
(45) Date of Patent: Feb. 25, 2014

(54) APPARATUS AND METHOD FOR POWER CONTROL OF A CENTRAL PROCESSING UNIT IN A MULTI-CORE SYSTEM

(75) Inventors: Ji-Hwan Park, Seoul (KR); Hyun-Moo Kim, Seongnam-si (KR); Nam-Su Ha, Anyang-si (KR); Jung-Hwan Choi, Seongnam-si (KR); Jin-Hyo Kim, Hwaseong-si (KR); Tae-Il Kim, Seoul (KR); Il-Hyun Cho, Seoul (KR); Sung-Joon Jang, Wonju-si (KR); Hye-Sun Kim, Suwon-si (KR); Jin-Kyoung Du, Seoul (KR)

(73) Assignee: Samsung Electronics Co., Ltd (KR)

( * ) Notice: Subject to any disclaimer, the term of this patent is extended or adjusted under 35 U.S.C. 154(b) by 233 days.

(21) Appl. No.: 12/909,417

(22) Filed: Oct. 21, 2010

(65) Prior Publication Data

US 2011/0093724 A1    Apr. 21, 2011

(30) Foreign Application Priority Data

Oct. 21, 2009   (KR) .......................... 10-2009-0100205

(51) Int. Cl.
 *G06F 1/32*   (2006.01)
(52) U.S. Cl.
 CPC .............. *G06F 1/324* (2013.01); *G06F 1/3287* (2013.01); *G06F 1/3296* (2013.01); *Y02B 60/1214* (2013.01); *Y02B 60/1217* (2013.01)
 USPC ............ 713/323; 713/322; 713/324; 713/330
(58) Field of Classification Search
 USPC ........................................................ 713/300
 See application file for complete search history.

(56) References Cited

U.S. PATENT DOCUMENTS

| | | | |
|---|---|---|---|
| 6,996,728 B2 * | 2/2006 | Singh | 713/300 |
| 7,596,705 B2 * | 9/2009 | Kim | 713/300 |
| 7,702,938 B2 | 4/2010 | Ha | |
| 7,761,874 B2 * | 7/2010 | Bodas | 718/100 |
| 8,015,423 B1 * | 9/2011 | Satterfield et al. | 713/322 |
| 8,190,939 B2 * | 5/2012 | Fields et al. | 713/324 |
| 8,225,119 B2 * | 7/2012 | Jain et al. | 713/320 |
| 2002/0188877 A1 | 12/2002 | Buch | |
| 2004/0123297 A1 | 6/2004 | Flautner et al. | |
| 2005/0125705 A1 * | 6/2005 | Cheng et al. | 713/322 |
| 2006/0129852 A1 * | 6/2006 | Bonola et al. | 713/300 |
| 2006/0184287 A1 * | 8/2006 | Belady et al. | 700/291 |
| 2006/0288243 A1 * | 12/2006 | Kim | 713/300 |
| 2007/0016815 A1 * | 1/2007 | Cooper et al. | 713/322 |
| 2009/0187777 A1 * | 7/2009 | Clark | 713/320 |
| 2010/0037038 A1 * | 2/2010 | Bieswanger et al. | 712/220 |
| 2010/0218005 A1 * | 8/2010 | Jain et al. | 713/300 |
| 2010/0332876 A1 * | 12/2010 | Fields et al. | 713/323 |

FOREIGN PATENT DOCUMENTS

KR   1020060128562   12/2006

* cited by examiner

*Primary Examiner* — Ryan Stiglic
(74) *Attorney, Agent, or Firm* — The Farrell Law Firm, P.C.

(57) ABSTRACT

A power control method of a Central Processing Unit (CPU) in a multi-core system. The power control method includes acquiring current usage information of the CPU and system information, estimating a CPU usage of a next time interval based on the acquired current usage information, calibrating the estimated CPU usage of the next time interval based on the acquired system information, and determining a power control mode based on at least one of the acquired system information and the calibrated CPU usage of the next time interval.

14 Claims, 5 Drawing Sheets

APPARATUS AND METHOD FOR POWER CONTROL OF A CENTRAL PROCESSING UNIT IN A MULTI-CORE SYSTEM

PRIORITY

This application claims priority under 35 U.S.C. §119(a) to an application entitled filed in the Korean Industrial Property Office on Oct. 21, 2009 and assigned Serial No. 10-2009-0100205, the content of which is hereby incorporated by reference.

BACKGROUND OF THE INVENTION

1. Field of the Invention

The present invention relates generally to an apparatus and a method for power control of a Central Processing Unit (CPU), and more particularly, to an apparatus and a method for power control of a CPU in a multi-core system.

2. Description of the Related Art

In general, a CPU with a faster processing speed has a better performance at a higher operation frequency, that is, at a higher clock. However, the higher the operation frequency of a CPU, the more the power consumed by the CPU. Therefore, in order to minimize power consumption, the operation frequency of a CPU is properly controlled.

Further, due to technical restrictions in raising the operation frequency of a CPU, a multi-core system using a plurality of CPUs in parallel has recently been proposed.

However, according to the conventional method of power control of a CPU in the existing multi-core system, a minimum power is supplied to a core in a standby state, which still causes unnecessary power consumption. Additionally, in order to determine a power policy for the existing multi-core system, all multiple power policies are calculated, which increases the complexity of the calculation.

SUMMARY OF THE INVENTION

The present invention has been made to solve at least the above-described problems occurring in the prior art, and to provide at least the advantages described below.

Accordingly, an aspect of the present invention is to provide a method and an apparatus for efficient power control in a multi-core system.

Another aspect of the present invention is to provide a power control method and apparatus, which can power off an idle core, when not operating, in a multi-core system.

Another aspect of the present invention is to provide a power control method and apparatus, which adaptively apply a frequency/voltage control and a core on/off scheme in a multi-core system.

Another aspect of the present invention is to provide a power control method and apparatus, which can minimize the operation overhead and select a power policy in consideration of an operation environment in a multi-core system.

In accordance with an aspect of the present invention, a power control method of a Central Processing Unit (CPU) in a multi-core system is provided. The power control method includes acquiring, by a control unit, current usage information of the CPU and system information; estimating, by a usage estimation unit, a CPU usage of a next time interval based on the acquired current usage information; calibrating, by a usage calibration unit, the estimated CPU usage of the next time interval based on the acquired system information; and determining, by a mode selection unit, a power control mode based on at least one of the acquired system information and the calibrated CPU usage of the next time interval.

In accordance with another aspect of the present invention, a power control apparatus of a CPU in a multi-core system is provided. The power control apparatus includes a control unit that acquires current usage information of the CPU and system information; a usage estimation unit that estimates a CPU usage of a next time interval based on the acquired current usage information; a usage calibration unit that calibrates the estimated CPU usage of the next time interval based on the acquired system information; and a mode selection unit that determines a power control mode based on at least one of the acquired system information and the calibrated CPU usage of the next time interval.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The embodiments of the present invention described herein employ two basic elements in power control of a CPU in a multi-core system. One element is to control the frequency/voltage level, and the other element is to control powering on/off of each core of the multi-core system. Therefore, CPU usage information of a next time interval is first estimated based on current CPU usage information, the estimated CPU usage information of the next time interval is calibrated by using various pieces of system information, and a power control scheme according to an embodiment of the present invention is adaptively applied according to a result of the calibration. Specifically, power control schemes employed by the embodiments of the present invention described herein include a voltage/frequency control scheme and a core on/off scheme, and an embodiment of the present invention adaptively selects and applies at least one of the two schemes in the power control.

Further, in selecting a power policy used for the power control, an embodiment of the present invention may select either only one power policy or some grouped power policies, in consideration of system information, among all the power policies provided by the system in order to reduce the quantity of calculation in relation to the power policy.

Figure 1:
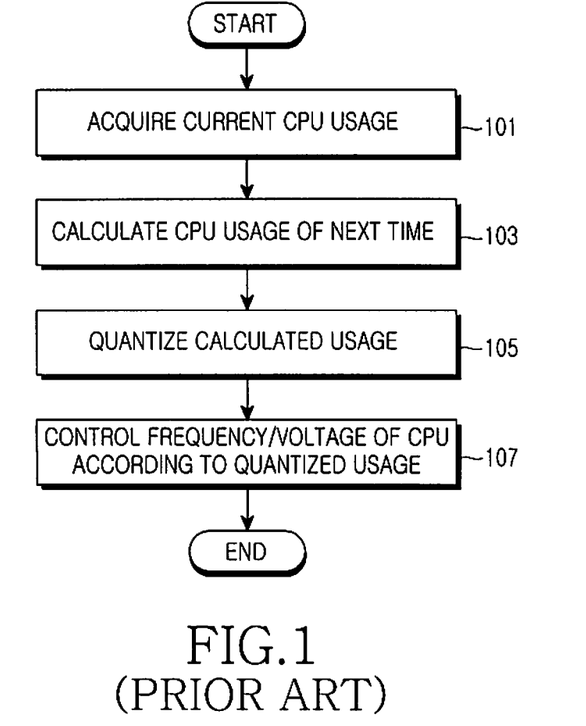
FIG. 1 is a flowchart illustrating a power control method of a CPU in a conventional multi-core system.

FIG. 1 is a flowchart illustrating a power control method of a CPU in a conventional multi-core system.

Referring to FIG. 1, in step 101, a current usage of the work performed by a CPU is measured. In step 103, a CPU usage of the next reference time interval is calculated using the measured usage. In step 105, the calculated usage is quantized. In step 107, the operation frequency and voltage necessary for the CPU are controlled according to the quantized usage.

For example, assuming that the current usage of the work performed by a CPU measured in step 101 is 33% of the maximum capability of the CPU, and the CPU usage of the next reference time interval calculated based on the measured usage is 37% of the maximum capability of the CPU, if the usage of the CPU has been set to be one of 10%, 50%, and 100% of the maximum capability of the CPU, the usage, which is 37% of the maximum capability of the CPU, is quantized to 50% of the maximum capability of the CPU. In step 107, the operation frequency and voltage necessary for the CPU are controlled according to the quantized usage, which is 50% of the maximum capability of the CPU. The voltage may be predetermined in the system to be determined according to the operation frequency.

However, in the power control scheme of a CPU of the conventional multi-core system, the power is interrupted in the idle state in which all cores do not operate. For example, in a system having four cores (core #0, #1, #2, and #3), in which only core #0 and core #1 are in an operation state, that is, active state, while core #2 and core #3 are in a standby state, for core #0 and core #1, the frequency/power are controlled according to the scheme described above with reference to FIG. 1. However, although it is unnecessary to supply electric power to core #2 and core #3, the electric power is supplied to core #2 and core #3 also and a minimum operation frequency and a minimum operation voltage are maintained for core #2 and core #3.

Additionally, the multi-core system may employ various power policies.

Figure 2:
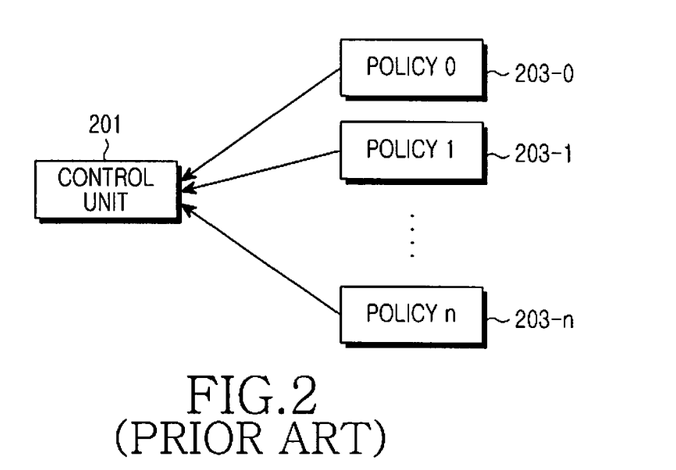
FIG. 2 is a block diagram for describing a scheme for selecting a power policy from multiple power policies in a conventional multi-core system.

FIG. 2 is a block diagram for describing a scheme of selecting a power policy from multiple power policies in a conventional multi-core system.

Referring to FIG. 2, when the system has n power policies 203-0, . . . , 203-n, a control unit 201 calculates all usages of a CPU for each of the n power policies 203-0, . . . , 203-n, selects a power policy in preparation for a situation, in which the usage of the CPU is maximized, from the n power policies, and controls the operation frequency and voltage of the CPU according to the selected power policy. Although this scheme focuses on the maintenance of the performance of the system, the quantity of calculation increases as the number of power policies supported by the system increases.

In the power control scheme of a CPU of the conventional multi-core system as described above, a minimum power is supplied even to a core in a standby state, which causes unnecessary power consumption and also increases the calculation of all the multiple power policies, thereby increasing the complexity of the calculation.

Figure 3:
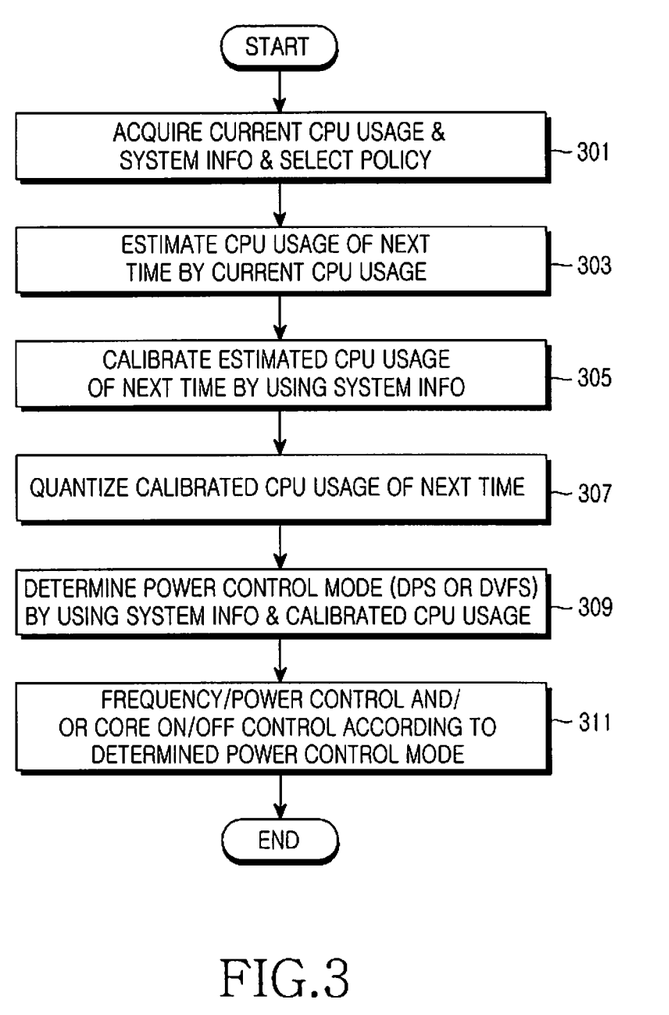
FIG. 3 is a flowchart illustrating a method of power control of a CPU in a multi-core system according to an embodiment of the present invention.

FIG. 3 is a flowchart illustrating a method of power control of a CPU in a multi-core system according to an embodiment of the present invention.

Referring to FIG. 3, in step 301, the current usage and system information of the CPU are acquired. The system information refers to information transferred from a kernel, a hardware monitor, etc., and includes information of a thread, a cache, a network, an interrupt, etc. Further, a power policy for power control is selected. It is assumed that the operations in steps 303 to 309 described below are based on the selected power policy. The scheme for selection of a power policy for the power control will be described in more detail later with reference to FIGS. 5 and 6.

In step 303, a CPU usage of the next time interval is estimated based on the acquired CPU usage information using various schemes.

For example, an interval for a plurality of the CPU usage is set, a table mapping the current CPU usage and the CPU usage of the next time interval can be used in the interval of the CPU usage, and the mapping table can be determined based on the statistical method.

In step 305, the estimated CPU usage of the next time interval is calibrated based on the system information. The operation environment of the CPU may be reflected in the usage calibration. Accordingly, the threshold is variably operated in the calibration of the CPU usage.

For example, in a system in which a CPU usage is quantized in steps of 0%, 50%, and 100%, if the estimated usage is 45%, the usage of the CPU is set to be 50%. However, in this case, because there is a margin of only 5%, the usage of the CPU may become insufficient according to the operation environment of the system. Therefore, a predetermined threshold is used in the estimation of the usage in order to arrange a sufficient margin in the usage of the CPU.

If the system has a threshold of +20%, the usage estimated reflecting the threshold is 65%, so that the CPU operates with the usage of 100% according to the quantization step. However, when a fixed threshold regardless of the operation of the system is arranged and used, the margin for the usage of the CPU may be unnecessarily excessive. Therefore, an embodiment of the present invention operates the threshold in a variable manner according to the system operation situation.

That is, in consideration of the operation environment of the CPU, in which the usage of the CPU either abruptly changes or is maintained constant, the threshold used in the calibration of the CPU usage changes.

For example, the CPU may temporarily enter into a sleep state due to a certain reason, even when the amount of work being performed by the CPU does not decrease. Then, although the usage of the CPU decreases, there is a high possibility of a situation requiring the normal usage again soon. Therefore, in consideration of this situation, it is possible to increase the threshold value and calibrate the estimation value of the CPU usage according to the increased threshold.

In step 307, the calibrated CPU usage is quantized. Obviously, the levels of the quantization may be different according to the system. However, some systems may not quantize the calibrated CPU usage as described above.

In step 309, the power control mode of the CPU is determined using the system information and the calibrated CPU usage. For example, the power control modes include a frequency/voltage control mode (Dynamic Voltage & Frequency Scaling; DVFS) and a core on/off mode (Dynamic Power Switching DPS).

The conventional multi-core system only controls the frequency/voltage as a power control scheme of a CPU. However, an embodiment of the present invention controls the number of ON/OFFs of cores as well as the frequency/voltage control scheme, and selects at least one of these control scheme, which consumes less power and can improve the system performance.

In step 311, the frequency/voltage and/or the core on/off are controlled according to the determined power control mode.

Figure 4:
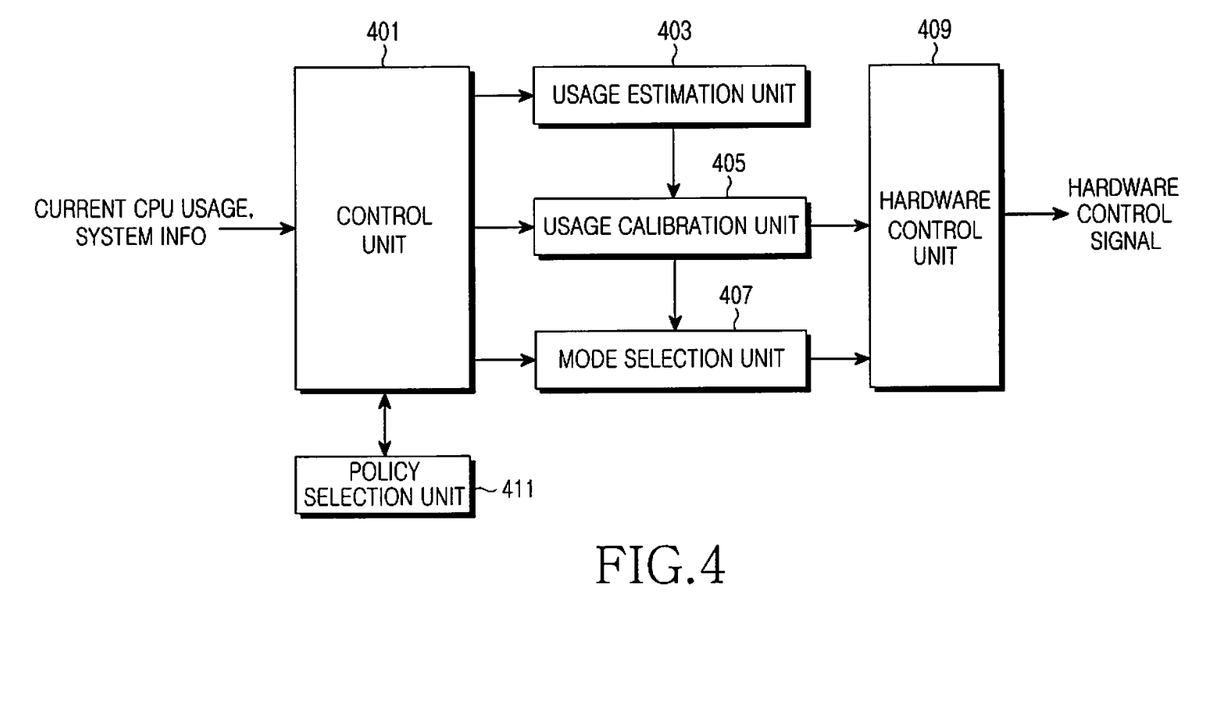
FIG. 4 is a block diagram illustrating a power control apparatus of a CPU in a multi-core system according to an embodiment of the present invention.

FIG. 4 is a block diagram illustrating a power control apparatus of a CPU in a multi-core system according to an embodiment of the present invention.

Referring to FIG. 4, a control unit 401 acquires current usage of a CPU and system information, and transfers the acquired information to a usage estimation unit 403, a usage calibration unit 405, and a mode selection unit 407. The system information refers to information transferred from a kernel, a hardware monitor, etc., and includes information of a thread, a cache, a network, an interrupt, etc.

Further, control unit 401 provides the system information to a policy selection unit 411, which selects a system power policy based on the system information and transfers the selected power policy back to control unit 401. Control unit 401 transfers the selected power policy to usage estimation unit 403, usage calibration unit 405, and mode selection unit 407, and control functional blocks to make them operate according to the selected power policy. A scheme for selecting the power policy between the control unit 401 and the policy selection unit 411 will be described in more detail later with reference to FIGS. 5 and 6.

The usage estimation unit 403 estimates the CPU usage of the next time interval by using the received current CPU usage information and transfers the estimated CPU usage to the usage calibration unit 405. The usage calibration unit 405 calibrates the CPU usage of the next time interval based on the estimated CPU usage and the system information. As described above, a variable threshold reflecting the operation state of the system may be reflected in the calibration of the CPU usage.

The usage estimation unit 403 may quantize the calibrated CPU usage. Although the quantizing the CPU usage is performed by usage calibration unit 405 in the above description, a separate functional block for the quantization may be configured according to the system configuration. As described above, the levels of the quantization may be different according to the system, while some systems may not even perform the quantization function.

Mode selection unit 407 selects a power control mode of the CPU based on the calibrated CPU usage transferred from usage estimation unit 403. As described above, an embodiment of the present invention controls the number of ON/OFFs of cores as well as the frequency/voltage control scheme, and selects at least one of these control scheme, which consumes less power and can improve the system performance.

Policy selection unit 411 receives the calibrated CPU usage, which is an output signal from usage calibration unit 405, and the determined power control mode information, which is an output signal from mode selection unit 407, and generates and outputs a power control signal, which is a hardware control signal for core on/off control and/or frequency/voltage control, according to the determined power control mode.

An example of a power control method of a CPU in a multi-core system according to an embodiment of the present invention will be described with reference to Table 1.

TABLE 1

| On core # / Freq | 4 | 3 | 2 | 1 |
|---|---|---|---|---|
| Step0 (Max) | 100% | 75% | 50% | 25% |
| Step1 | 90% | 67.5% | 45% | 22.5% |
| Step2 | 80% | 60% | 40% | 20% |
| Step3 | 70% | 52.5% | 35% | 17.5% |
| Step4 | 60% | 45% | 30% | 15% |
| StepN (Min) | 50% | 37.5% | 25% | 12.5% |

Table 1 shows the number of cores in the "ON" state and the power/frequency according to the CPU usage in a system quantizing and operating the performance of the CPU. Table 1 is based on an assumption that the current CPU usage is 67.5%.

In Table 1, the current frequency/power level corresponds to step 1 and the number of cores in the "ON" state is three. If the CPU usage of the next time interval, which has been estimated by usage estimation unit 403 and calibrated by usage calibration unit 405 as illustrated in FIG. 4, is 45%, the mode selection unit 407 maintains the current frequency/power level (step 1) and determines the number of cores in the "ON" state as two.

As described above with reference to FIG. 2, in the conventional system supporting multiple power policies, the CPU usage according to all the power policies are calculated, which increases the quantity of calculation. However, according to certain embodiments of the present invention, instead of calculating the CPU usage according to all the power policies, a power policy having a high accuracy according to the operation environment based on the power policy is selected (FIG. 5) or a power policy is selected from power policies grouped according to the characteristics of the power policies (FIG. 6).

Figure 5:
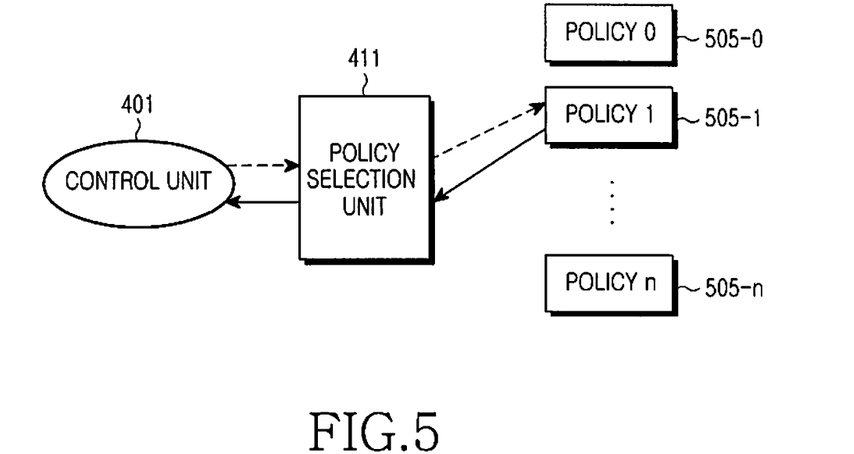
FIG. 5 is a block diagram illustrating a first scheme of determining a power policy for power control of a CPU in a multi-core system according to an embodiment of the present invention.
Figure 6:
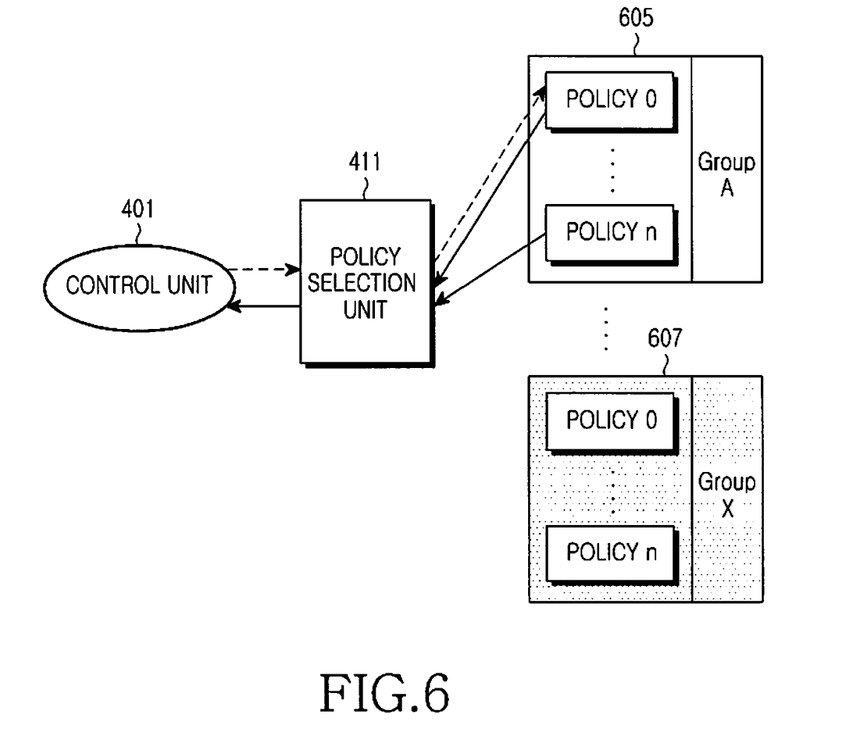
FIG. 6 is a block diagram illustrating a second scheme of determining a power policy for power control of a CPU in a multi-core system according to an embodiment of the present invention.

FIG. 5 is a block diagram illustrating a first scheme of determining a power policy for power control of a CPU in a multi-core system according to an embodiment of the present invention.

Referring to FIG. 5, a control unit 401 provides current usage and system information to a policy selection unit 411, and the policy selection unit 411 selects power policies proper for the provided information and notifies the control unit 401 of the selected power policies.

According to another possible scheme, when the control unit 401 has determined a power policy among the power policies according to a user setting, the control unit 401 may notify the policy selection unit 411 of the determined power policy, or the policy selection unit 411 may read the determined power policy and report it to the control unit 401. For example, this scheme can be used when a user wants to select a power policy advantageous to the power efficiency rather than the system performance.

FIG. 6 is a block diagram illustrating a second scheme of determining a power policy for power control of a CPU in a multi-core system according to an embodiment of the present invention.

Referring to FIG. 6, although the general operation thereof is similar to that of FIG. 5, in advance, power policies are bundled into groups according to their characteristics. For example, group A 605 may be a power policy group mainly advantageous to the system performance, while group X 607 may be a power policy group mainly advantageous to the power efficiency. Therefore, when the control unit 401 transfers a command for selecting group A 603 and system information to the policy selection unit 411, the policy selection unit 411 selects a power policy proper for the system information from power policies in group A 603 and transfers the selected power policy to the control unit 401.

As another example, the policy selection unit 411 reads all the power policies in group A 603 and transfers the read power policies to the control unit 401, and the control unit 401 transfers all the power policies in group A 603 to the usage estimation unit 403, the usage calibration unit 405, and the mode selection unit 407. Then, each of the usage estimation unit 403, the usage calibration unit 405, and the mode selection unit 407 may determine again a proper power policy in group A.

According to the conventional power policy selection scheme, the CPU usage of all the power policies is calculated, and a power policy in preparation for a situation, in which the usage of the CPU is maximized, is selected from all the power policies. Therefore, in the conventional power policy selection scheme, the quantity of calculation linearly increases according to the number of the power policies.

However, according to the power policy selection schemes of the present invention as described above with reference to FIGS. 5 and 6, a power policy having a high accuracy according to the operation environment may be selected regardless of the number of all the power policies in the system (FIG. 5) or a power policy may be selected from power policies grouped according to the characteristics of the power policies (FIG. 6). Therefore, the power policy selection schemes according to the embodiments of the present invention reduce the operation overhead in comparison with the conventional scheme.

Figure 7:
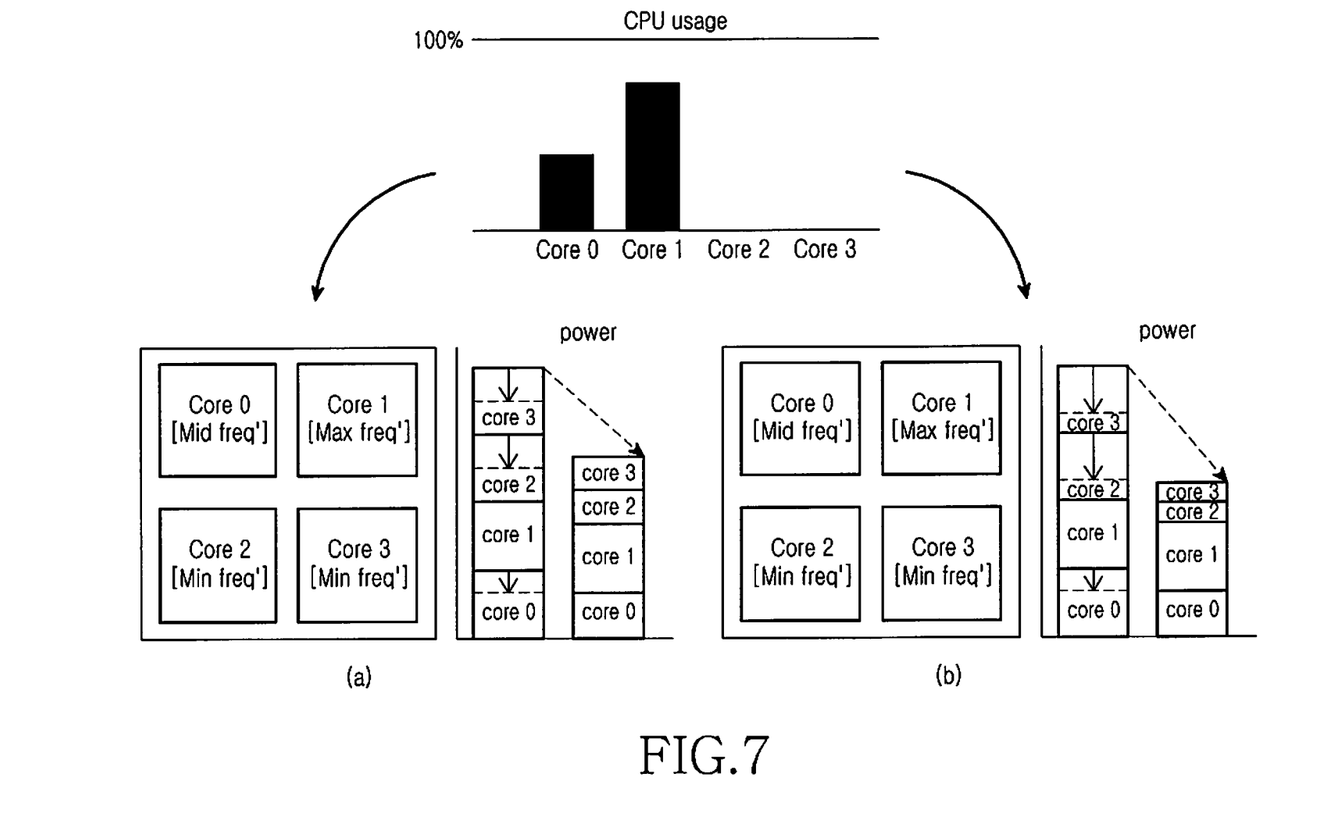
FIG. 7 illustrates a result of comparison between a conventional power control method and a power control method according to an embodiment of the present invention.

FIG. 7 illustrates a result of a comparison between a conventional power control method and a power control method according to an embodiment of the present invention.

In FIG. 7, (a) corresponds to power consumption by the conventional power control method and (b) corresponds to power consumption by the power control method according to an embodiment of the present invention.

Both methods assume that core #0 corresponds to a usage of 30%, core #1 corresponds to a usage of 80%, and core #2 and core #3 correspond to a usage of 0%. It is noted that both core #2 and core #3 in (a) are in the "ON" state and maintain the minimum frequency/voltage, which consumes a considerable quantity of power while core #2 and core #3 in (b) are in the "OFF" state and consume nearly no power. Therefore, a power control method of a CPU in a multi-core system according to an embodiment of the present invention reduces the power consumption in comparison with the conventional method.

Although a power control method of a CPU in a conventional multi-core system employs only the frequency/voltage control scheme, the embodiments of the present invention adaptively apply a frequency/voltage control and a core on/off scheme according to the operation environment of a multi-core system, thereby improving the system performance and reducing the power consumption.

Further, the embodiments of the present invention can minimize the operation overhead and select a power policy in consideration of an operation environment in a multi-core system.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A power control method of a Central Processing Unit (CPU) in a multi-core system including a plurality of cores, the power control method comprising the steps of:
   acquiring, by a control unit, current usage information of the CPU and system information;
   estimating, by a usage estimation unit, a CPU usage of a next time interval based on the acquired current usage information;
   calibrating, by a usage calibration unit, the estimated CPU usage of the next time interval using a variable threshold, the variable threshold being determined according to the acquired system information, the acquired system information indicating an operation state of the multi-core system; and
   determining, by a mode selection unit, a power control mode based on at least one of the acquired system information and the calibrated CPU usage of the next time interval,
   wherein the power control mode includes a first power control mode to control powering on/off of at least one of the plurality of cores.

2. The power control method of claim 1, wherein the power control mode includes a second power control mode to control a frequency-power level.

3. The power control method of claim 2, further comprising controlling, by a hardware control unit, powering on/off of at least one of the plurality of cores and the frequency-power level according to the determined power control mode.

4. The power control method of claim 1, further comprising quantizing, by the usage estimation unit, the calibrated CPU usage of the next time interval.

5. The power control method of claim 1, further comprising selecting, by a policy selection unit, a power policy from all power policies supported by the multi-core system according to the acquired system information,
   wherein the power control method is performed based on the selected power policy.

6. The power control method of claim 1, wherein the variable threshold is determined according to system information indicating an abruptness at which the CPU usage changes.

7. The power control method of claim 1, wherein the variable threshold is determined in consideration of whether the CPU has entered a sleep state without a decrease in work to be performed by the CPU.

8. A power control apparatus of a Central Processing Unit (CPU) in a multi-core system including a plurality of cores, the power control apparatus comprising:
   a control unit that acquires current usage information of the CPU and system information;
   a usage estimation unit that estimates a CPU usage of a next time interval based on the acquired current usage information;
   a usage calibration unit that calibrates the estimated CPU usage of the next time interval using a variable threshold, the variable threshold being determined according to the acquired system information, the acquired system information indicating an operation state of the multi-core system; and
   a mode selection unit that determines a power control mode based on at least one of the acquired system information and the calibrated CPU usage of the next time interval,
   wherein the power control mode includes a first power control mode to control powering on/off of at least one of the plurality of cores.

9. The power control apparatus of claim 8, wherein the power control mode include a second power control mode to control a frequency-power level.

10. The power control apparatus of claim 9, further comprising a hardware control unit that controls powering on/off of at least one of the plurality of cores and the frequency-power level according to the determined power control mode.

11. The power control apparatus of claim 8, wherein the usage estimation unit quantizes the calibrated CPU usage of the next time interval.

12. The power control apparatus of claim 8, further comprising a policy selection unit that selects a power policy from all power policies supported by the multi-core system according to the acquired system information,
   wherein the control unit controls the usage estimation unit, the usage calibration unit, and the mode selection unit to perform their operations based on the selected power policy.

13. The power control apparatus of claim 8, wherein the variable threshold is determined according to system information indicating an abruptness at which the CPU usage changes.

14. The power control apparatus of claim 8, wherein the variable threshold is determined in consideration of whether the CPU has entered a sleep state without a decrease in work to be performed by the CPU.

\* \* \* \* \*